United States Patent [19]

Ealey

[11] Patent Number: 5,037,184

[45] Date of Patent: Aug. 6, 1991

[54] DEFORMABLE MIRROR ACTUATOR ATTACHMENT

[75] Inventor: Mark A. Ealey, Ayer, Mass.

[73] Assignee: United Technologies Corporation, Hartford, Conn.

[21] Appl. No.: 451,696

[22] Filed: Dec. 18, 1989

[51] Int. Cl.⁵ ............................................... G02B 5/08
[52] U.S. Cl. .................................. 359/849; 359/900; 359/903; 335/215
[58] Field of Search ............... 350/607, 608, 609, 610, 350/611, 486, 487, 320, DIG. 3; 335/285, 286, 215

[56] References Cited

U.S. PATENT DOCUMENTS

| | | | |
|---|---|---|---|
| 2,555,387 | 6/1951 | Zobel | 350/611 |
| 4,679,915 | 7/1987 | Kriz et al. | 350/610 |
| 4,734,557 | 3/1988 | Alfille et al. | 350/608 |
| 4,831,291 | 5/1989 | Ames | 350/611 |
| 4,861,149 | 8/1989 | Ealey | 350/611 |
| 4,906,087 | 3/1990 | Ealey et al. | 350/607 |

Primary Examiner—Bruce Y. Arnold
Assistant Examiner—R. D. Shafer
Attorney, Agent, or Firm—Edward L. Kochey, Jr.

[57] ABSTRACT

Oppositely polarized magnets are secured to a deformable mirror and a corresponding actuator. They rely on magnetic attraction to maintain the connection between the actuator and mirror. A reverse magnetic field is imposed when the actuator is to be removed for repair.

2 Claims, 1 Drawing Sheet

DEFORMABLE MIRROR ACTUATOR ATTACHMENT

TECHNICAL FIELD

The invention relates to deformable mirrors and in particular to securing actuators thereto and releasing the actuators.

BACKGROUND OF THE INVENTION

Deformable mirrors require securing the mirror to a housing, usually at its outer periphery, and using actuators at multiple locations on the mirror structure. Various linear actuators have been used for this purpose including magnetostrictive and piezoelectric types. In any event they require attachment of the actuator drive mechanism to the mirror structure in a manner which can both push and pull.

This has been accomplished sometimes in the past with a permanent attachment technique such as adhesive bonding, frit bonding or brazing. Replacement of a failed actuator in such a design is either difficult or impossible without damage to the mirror.

Other attachment techniques have been used to facilitate removal. These included designs with retract springs adjacent to the actuators to ensure proper faceplate retraction during push/pull operation. Ultrafine threads were also necessary to facilitate actuator replacement without disturbing the high quality optical surface. Mechanical hysteresis alignment and the galling of threads remained significant performance problems. The complexity associated with a mechanical preloaded attachment mechanism required an intensive and time consuming actuator installation process. This greatly limited its scalability to a structure requiring many hundred actuators on a deformable mirror.

Other designs imposed high stress concentrations in the springplate/faceplate inner face. Even with the difficulties of the prior art attachment mechanisms, they were acceptable since the risk of even one actuator failing in a permanent attachment design prevents even more difficulties.

Thus, there is a need for an attachment mechanism that allows for ease of replacement, does not degrade deformable mirror performance nor the optical surface, that is cost effective and allows for automated actuator installation.

SUMMARY OF THE INVENTION

A deformable mirror faceplate has secured thereto, either directly or through a heat exchanger, a plurality of pole pieces. Each pole piece is associated with an actuator and the pole piece is of magnetically attractable material.

A support housing secures the outer edges of the faceplate and also carries a plurality of actuators. The linearly removable actuator rod within each actuator extends toward a corresponding pole piece and has secured to the end thereof a button of magnetically attractable material. At least one of either the pole piece or button is a permanent magnet. Both may be permanent magnets if they are of opposite polarities.

The actuator is disconnected from the pole pieces by imposing a magnetic field from the faceplate side of the mirror opposite to that of the magnet. Once a magnetic field is countered, the actuator may easily be removed without damage to either the actuator or the mirror.

DESCRIPTION OF THE PREFERRED EMBODIMENT

Figure 1:
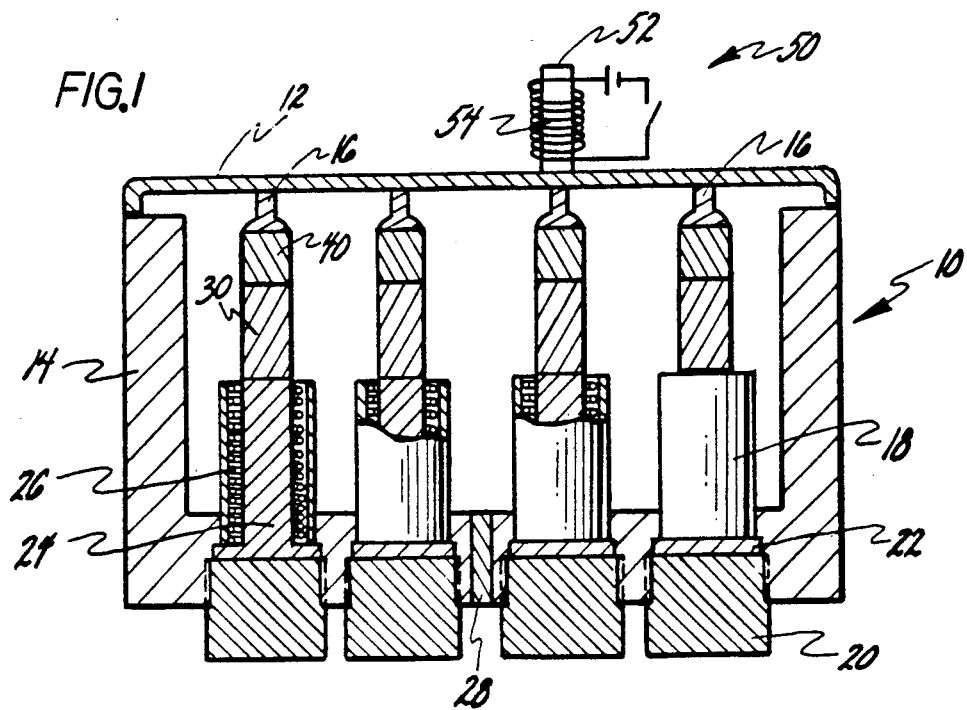
FIG. 1 is a sectional view showing a plurality of actuators.

A deformable mirror arrangement 10 has a deformable mirror 12 secured at its outer periphery to support housing 14. A plurality of pole pieces 16 are secured with epoxy to the mirror face sheet. These poles or actuator pads are of soft magnetic steel (such as Permendur). The face sheet complete with the pole pieces attached is then epoxied to the mirror housing 14.

An actuator 18 is associated with each pole piece. The actuator is secured by set screw 20 within the support housing with rib 22 being trapped so that the actuator may react against the housing in either direction. Each actuator 18 includes a linearly movable actuator rod 24 of terfenol which is a magnetostrictive material.

Coils 26 carry electric current introduced through connector 28 so that the magnetic field may be controllable adjusted and accordingly the length of the terfenol portion of the actuator rod controllably varied.

Spacer 30 is supplied at the end of the actuator rod and epoxied to the terfenol portion. This spacer is for the purpose of separating the magnetic fields.

Epoxied to the end of each spacer 30 is a button 40 of magnetically attractable material. In this case button 40 is a permanent magnet which interacts with pole piece 16 to secure the actuator rod thereto.

A seemingly permanent bond is made to the pole piece. In order to replace an actuator the release tool 50 is used. This includes a soft iron core 52 and a coil 54. This tool is place on the faceplate side of the assembly opposite the actuator to be disconnected. Passing an electric current through the coil establishes a magnetic field which is opposite that imposed by the permanent magnet. Removal of set screw 20 permits the actuator to be removed.

Figure 2:
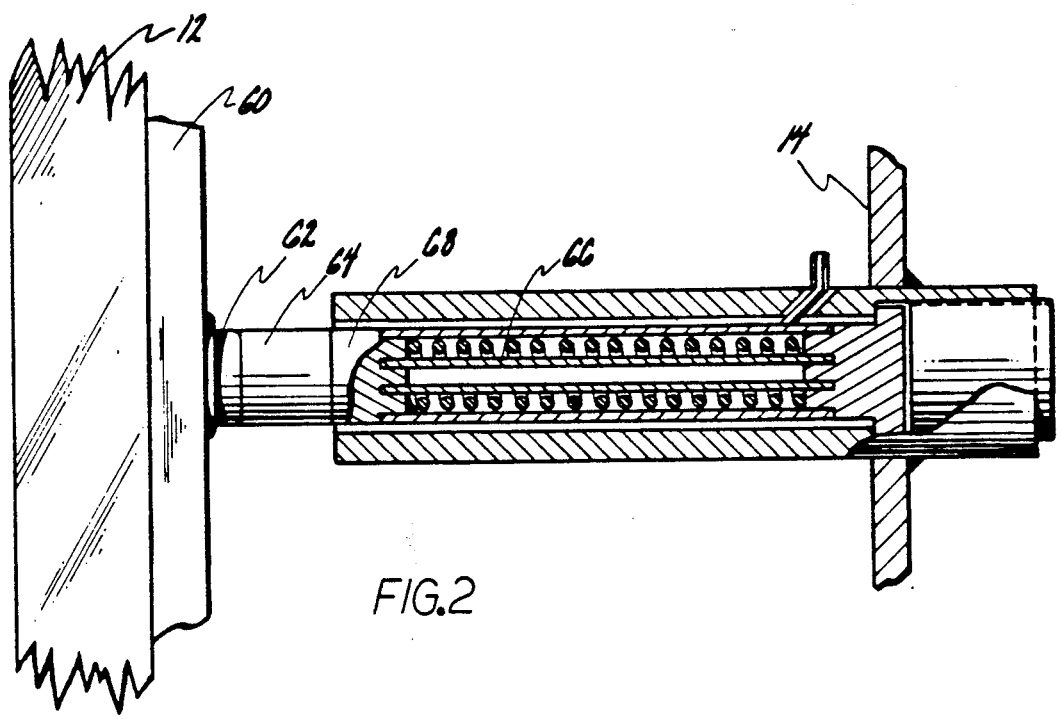
FIG. 2 is a sectional view showing one actuator.

FIG. 2 illustrates an embodiment wherein faceplate 12 has a heat exchanger 60 secured to the reverse side thereof. Pole piece 62 is a permanent magnet of one polarity while button 64 is a permanent magnet of opposite polarity.

Terfenol rod 66 carries spacer 68 at its lower end which is epoxied to button 64.

This attachment may be used for any type actuator. In fact the magnetostrictive actuator illustrated here is the most difficult because of the potential for the magnetic field set up in operating the actuator to disconnect the magnetic attachment. However, typical fields produced by the solenoids in a magnetostrictive actuator are less than 40 oersteds. This is 40 gauss for air where ur equals 1. This is a factor of 100 less than the field necessary to break the magnetic attachment bond.

There are few mechanical parts required in this structure. Material aging and stress induced creep is virtually nonexistent. The mechanical design is a self contained modular unit completely replaceable and scalable. The permanent magnets withstand a multilayer dielectric coating environment with negligible irreversible loss.

The deformable mirror is serviceable after initial actuator installation. Minimum optimal service degradation is experienced with actuator replacement. The magnetic detachment mechanism avoids strain of the optical faceplate and thereby reduces optical figure degradation during the replacement procedure.

Precise mechanical tolerances are not required as in other bidirectional connections because of the nature and range of the magnetic field. A drop in, tie down procedure with little mechanical effect on the faceplate is possible.

Mechanical hysteresis caused by prior art preload mechanisms and mechanical interface actuations as well as material creep is substantial. Here there is no preload, no ultrafine threads and a minimum of parts which significantly reduces the mechanical hysteresis. Time dependent material creep caused by metal under stress from preload and adjustment mechanisms is eliminated. Thus, performance is enhanced, especially over a period of time.

I claim:

1. In a deformable mirror arrangement having a deformable mirror with a front side and a reverse side, and an actuator having a linearly movable adjustor rod the method of securing and releasing said rod to and from said mirror comprising:

securing a pad of magnetically attractable material to the reverse side of said mirror;

securing a button of magnetically attractable material to one end of said actuator rod;

making at least one of said pad and said button a permanent magnet;

locating said actuator rod adjacent said pad with said button in physical contact under the influence of a first magnetic field established by said permanent magnet;

thereafter establishing a second magnetic field in the area of said pad from a location on the front side of said mirror, said second magnetic field being of opposite polarity to said first magnetic field; and removing said actuator from said pad.

2. A method of securing and releasing an actuator having an actuator rod to and from a deformable mirror having a face side and a reverse side comprising:

securing on the reverse side of said mirror a plurality of magnetically attractable pole pieces;

securing at a first end of said actuator rod a magnetically attractable button;

establishing a first magnetic field with one pole piece of said pole pieces and said actuator rod;

securing said actuator to said mirror by placing said actuator rod with said first end in closely spaced relationship with said one pole piece and permitting said first magnetic field to draw said rod and said one pole piece into contact;

releasing said actuator from said mirror by establishing a second magnetic field of opposite polarity from the face side of said mirror of sufficient magnitude to substantially overcome said first magnetic field; and removing said actuator.

* * * * *